(12) United States Patent
Katahanas et al.

(10) Patent No.: US 12,360,785 B2
(45) Date of Patent: Jul. 15, 2025

(54) INTER-PLATFORM CONTROL INTERFACE

(71) Applicants: Atlassian Pty Ltd., Sydney (AU); Atlassian Inc., San Francisco, CA (US)

(72) Inventors: Jonathan George Katahanas, Sydney (AU); Abhinav Kishore, Sydney (AU); Cornelis Jacobus Alant, Sydney (AU); James Rotanson, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 574 days.

(21) Appl. No.: 17/708,480

(22) Filed: Mar. 30, 2022

(65) Prior Publication Data

US 2023/0315493 A1 Oct. 5, 2023

(51) Int. Cl.
| | |
|---|---|
| *G06F 9/451* | (2018.01) |
| *G06F 16/3332* | (2025.01) |
| *G06F 21/31* | (2013.01) |
| *G06F 40/12* | (2020.01) |

(52) U.S. Cl.
CPC .......... *G06F 9/451* (2018.02); *G06F 16/3335* (2019.01); *G06F 21/31* (2013.01); *G06F 40/12* (2020.01)

(58) Field of Classification Search
CPC ...... G06F 9/451; G06F 16/3335; G06F 21/31; G06F 40/12; G06F 3/048; G06F 8/33; G06F 40/166; G06F 40/174
See application file for complete search history.

(56) References Cited

U.S. PATENT DOCUMENTS

| | | | |
|---|---|---|---|
| 2015/0082218 A1* | 3/2015 | Affoneh | G06F 9/451 715/771 |
| 2017/0330195 A1* | 11/2017 | Lange | G06F 3/04817 |
| 2019/0004821 A1* | 1/2019 | Uppal | G06F 3/04895 |
| 2020/0210934 A1* | 7/2020 | Bar-on | G06Q 10/063114 |

* cited by examiner

*Primary Examiner* — Rami R Okasha

(74) *Attorney, Agent, or Firm* — Brownstein Hyatt Farber Schreck, LLP

(57) ABSTRACT

A computing architecture including a backend executing over a host server, a frontend application instantiated by cooperation of a processor and a memory of a client device, and a rich content editing canvas service communicably coupled to at least one of the backend and the frontend. Operation of the rich content editing canvas service causes to be rendered in a graphical user interface of the frontend application a rich content editing canvas that can receive user input. The rich content editing canvas service can be leveraged to receive command and control instructions, from a user of the frontend application, that can cause one more operations to be executed by a separate platform backend.

19 Claims, 9 Drawing Sheets

INTER-PLATFORM CONTROL INTERFACE

TECHNICAL FIELD

Embodiments described herein relate to cloud-based software platforms and, in particular, to systems and methods for providing controlling and/or triggering operations of a backend of one cloud platform from a frontend of another cloud platform.

BACKGROUND

An organization can establish a collaborative work environment by providing its employees with access to a suite of discrete software platforms to facilitate cooperation and completion of work. In many cases, an organization may also define policies outlining best practices for recording, formatting, organizing, and accessing data associated with each software platform of a suite of software platforms.

However, users of multiple platforms are often required to conform to internal policies defining required workflows to input information to, and/or obtain information from, multiple platforms to complete work. For example, an engineer that discovers an issue in a product may be required by internal policy to document the issue in a documentation system, to open a ticket in an issue tracking system, and to use a messaging platform to notify a colleague of the issue. These requirements necessitate substantial context switching, reducing overall productivity.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
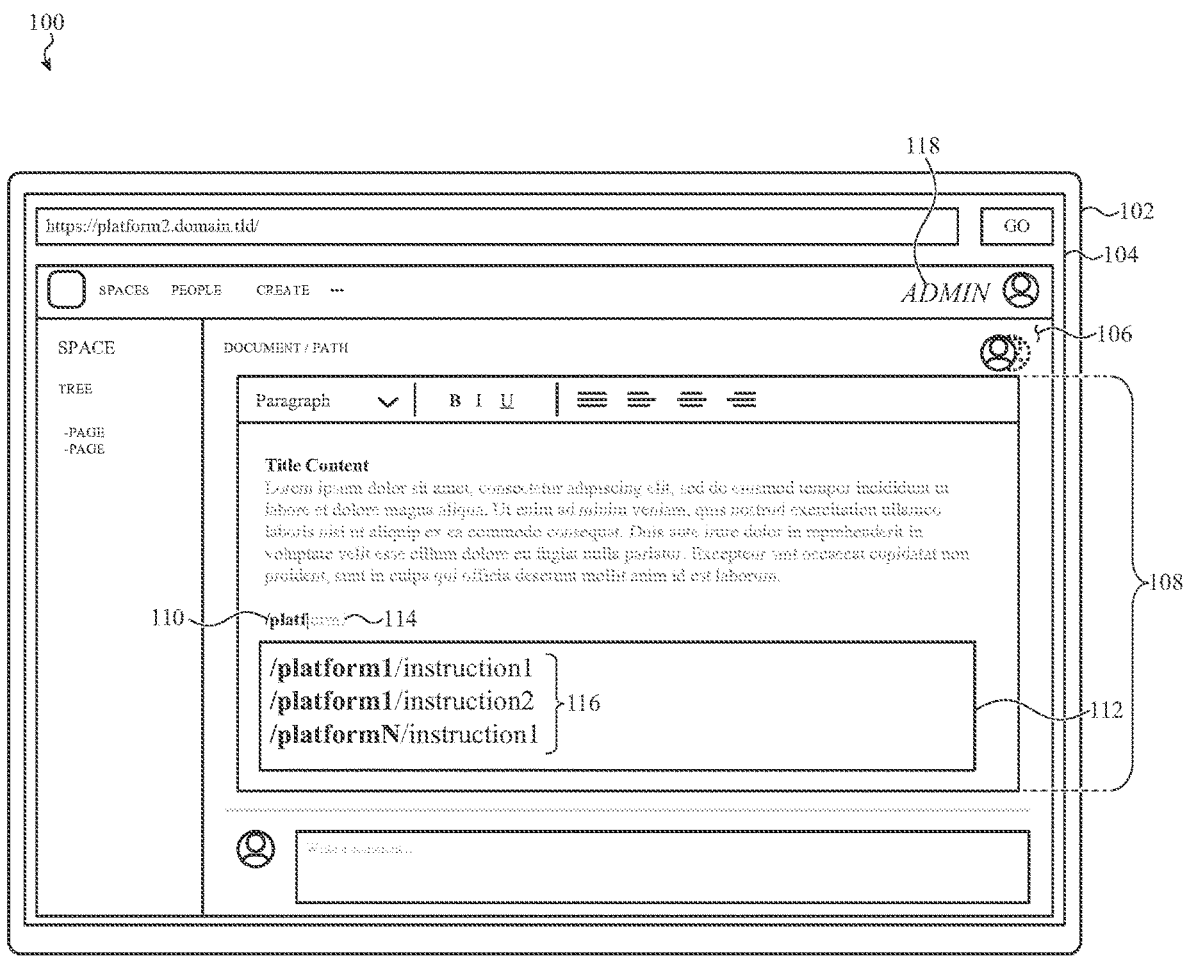
FIG. 1 depicts a display, of an electronic device executing an instance of a frontend application associated with a first software platform, rendering a graphical user interface including a multi-platform rich content editing element, supported by a service separate from the first software platform, that can receive user input to cause an executable instruction to be executed by a backend of a second platform.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems and methods for providing rich content editing user interface elements (e.g., herein "rich content editing canvases") as a service that can be leveraged by multiple software platforms in a secure and authenticated manner. In addition, as a result of this shared feature architecture, rich content editing canvas services as described herein can be configured to provide a command and control interface to interact with any suitable platform of a suite of platform from a frontend of any of those platform.

As a non-limiting example, a rich content editing canvas service as described herein can be configured to monitor, in real time, text input provided by a user to a rich content editing canvas rendered within a graphical user interface of a particular frontend application. The text input can be interpreted by the rich content editing canvas as one or more command and/or control commands (e.g., an "executable instruction") directed to another platform. As a result of this construction, a user can leverage convenient text input to command and control multiple platforms without context switching from the user's current platform.

For example, in one embodiment, a user in a multiplatform environment may use and operate a documentation platform and an issue tracking platform. In this example, both the issue tracking platform and the documentation platform may be associated with a respective frontend and a respective backend. Each platform may be additionally communicably and/or operably coupled to a rich content editing canvas service that can be called by each respective frontend whenever it is required to present the user of that respective frontend with an interface to edit text. For example, the documentation platform's frontend may call upon the rich content editing canvas service to render, or assist with rendering, a user input interface element to receive user text input when a user of the documentation platform requests to being editing a document stored by the documentation platform backend. Similarly, the issue tracking platform's frontend may call upon the rich content editing canvas service to render, or assist with rendering, a user input interface element to receive user text input when a user of the documentation platform opens a new issue (also referred to as a ticket), and begins typing an issue description.

In these examples, the rich content editing canvas service can parse text input provided by users of the documentation platform frontend and/or the issue tracking platform backend, monitoring for command and control keywords, phrases, trigger characters, and so on. In many cases, for example, the rich content editing canvas service can implement a slash command service that can be used by a user of either platform frontend to issue commands to the backend of the other system. For example, the user of the documentation platform frontend can input a slash command to the rich content editing canvas, rendered in the documentation platform frontend supported by the rich content editing canvas service, in order to create a new issue in the issue tracking platform. Similarly, the user of the issue tracking platform can leverage slash command syntax, enabled by the rich content editing canvas service, to edit, create, or delete a document stored by the documentation platform.

As described herein, a "rich content editing canvas" references a user interface element that can be leveraged by a user to draft and/or modify rich content including, but not limited to: formatted text; image editing; data tabling and charting; file viewing; and so on. These examples are not exhaustive; a person of skill in the art may readily appreciate that rich content editing elements can include and/or may be implemented to include many features, which may vary from embodiment to embodiment. For simplicity of description the embodiments that follow reference a rich content editing canvas configured for rich text editing, but it may be appreciated that this is merely one example.

As a result of architectures described herein, developers of software platforms that would otherwise dedicate resources to developing, maintaining, and supporting rich content editing features can dedicate more resources to developing other platform-differentiating features, without needing to allocate resources to development of software components that are already implemented in other platforms. In addition, as a result of the architectures described herein, services supporting the rich content editing canvas can be extended to include additional features and functionality—such as a "slash command" command and control feature—which, in turn, can automatically be leveraged by any further platform that incorporates a rich content editing canvas, and/or otherwise integrates with the rich content editing canvas service itself.

In addition, a rich content editing canvas service can be configured to provide suggested commands to a user as the user types. For example, as a user begins typing a slash command in a frontend of some platform that has integrated with a rich content editing canvas service as described herein, the rich content editing canvas service can monitor the user's typing to provide one or more suggestions of commands or controls (herein, simply "executable instructions") that may be useful to the particular user providing the text input.

For example, the rich content editing canvas service can be configured to suggest one or more platforms (e.g., discrete software products, associated with unique backends and unique frontend applications) to control or command as a user begins typing a slash command. The ordering of the suggestion list and/or the content of the suggestion list may vary from user to user and embodiment to embodiment. For example, when interacting with a documentation system, a user having a role of "developer" may be presented with options to command and control an issue tracking system and/or a code repository system. Alternatively, when interacting with the same documentation system, a user having a role of "human resources officer" may be presented with options to command and control a directory system or a benefits system, instead of the issue tracking system or the code repository system. More generally, in some embodiments described herein, a rich content editing canvas service can be configured to suggest to a user one or more platforms to command and control. These suggestions can be based on the user's role, a user interaction history by the same user, user interaction history of the user's colleagues, or any other suitable filtering/selection criteria.

In addition to the foregoing, a rich content editing canvas service as described herein can be configured to suggest discrete commands that can be performed by one or more platforms. As with preceding examples, the ordering of the suggestion list and/or the content of the suggestion list may vary from embodiment to embodiment and user to user. For example, the commands and/or command types presented to the user may vary based on that user's history, the user's role, and so on.

More generally and broadly, the embodiments described herein refence systems and methods for sharing user interface elements rendered by a rich content editing canvas service and features thereof (such as a slash command processor), between different software platforms in an authenticated and secure manner.

As noted above, a software platform as described herein may include a frontend and a backend configured to communicably couple over a computing network (which may include the open Internet) to exchange computer-readable structured data. Many software platforms described herein may be architected as software as a service platforms configured to operate over the open Internet to render custom webpages within user browser windows, although it may be appreciated that this is merely one example construction and other embodiments can be implemented with native applications.

A frontend as described herein may be a first instance of software executing on a client device, such as a desktop computer, laptop computer, tablet computer, or handheld computer (e.g., mobile phone). The backend may be a second instance of software executing over a processor allocation and memory allocation of a virtual or physical computer architecture. In many cases, although not required, the backend may support multiple tenancies. In such examples, a software platform may be referred to as a multitenant software platform.

For simplicity of description, multitenant embodiments presented herein reference software platforms from the perspective of a single common tenant. For example, as known to a person of skill in the art, an organization may secure a tenancy of multiple discrete software platforms, providing access for one or more employees to each of the software platforms. Although other organizations may have also secured tenancies of the same software platforms which may instantiate one or more backends that serve multiple tenants, it is appreciated that data of each organization is siloed, encrypted, and inaccessible to, other tenants of the same platform.

In many embodiments, the frontend and backend of a software platform—multitenant or otherwise—as described herein are not collocated, and communicate over a large area and/or wide area network by leveraging one or more networking protocols, but this is not required of all implementations.

As noted above, a frontend of a software platform as described herein may be configured to render a graphical user interface at a client device that instantiates frontend software. As a result of this architecture, the graphical user interface of the frontend can receive inputs from a user of the client device, which, in turn, can be formatted by the frontend into computer-readable structured data suitable for transmission to the backend for storage, transformation, and later retrieval.

One example architecture includes a graphical user interface rendered in a browser executing on the client device. In other cases, a frontend may be a native application executing on a client device. Regardless of architecture, it may be appreciated that generally and broadly a frontend of a software platform as described herein is configured to render a graphical user interface that includes a rich content editing canvas provided by a rich content editing canvas service to receive inputs from a user of the software platform and to provide outputs to the user of the software platform.

For simplicity of description, the embodiments that follow reference a configuration in which a rich content editing canvas service is configured to implement a slash command feature—including slash command suggestions—but it may be appreciated that this is merely one example and other configurations and constructions are possible.

These foregoing and other embodiments are discussed below with reference to FIGS. 1-5. However, those skilled in the art will readily appreciate that the detailed description given herein with respect to these figures is for explanation only and should not be construed as limiting.

Generally and broadly, FIG. 1 depicts a graphical user interface of a software platform configured to integrate with a rich content editing canvas service as described herein. In particular, the software platform is defined by a frontend application instantiated by a client device and a backend application instantiated by a host server, whether virtual or physical. The backend application can be communicably coupled to the frontend application so as to receive inputs from and to provide information to a user of the frontend application. In addition, although not depicted in FIG. 1, the backend application (and/or the frontend application) can be communicably coupled to a rich content editing canvas service, which may also be instantiated on a host server, whether virtual or physical. In some cases, the rich content editing canvas service instance can be instantiated over the same host server as the backend application, but this is not required of all embodiments.

In this construction, the backend application and/or the frontend application can submit requests to and receive inputs from the rich content editing canvas service instance in order to render a rich content editing canvas within a graphical user interface of the frontend application. In some cases, the rich content editing canvas service can be configured to transmit to the frontend application an executable file or script, such as a JavaScript™ file or script, that when executed by the frontend application causes to be rendered in the graphical user interface of the frontend application a rich content editing canvas that can receive user input.

As with other embodiments described herein, the rich content editing canvas service can be communicably coupled to the rich content editing canvas and/or the frontend application (e.g., via WebSockets) in order to receive and parse user input to the rich content editing canvas in real time or near real time. For example, as a user of the frontend application begins providing text input, the partial text input can be transmitted back to the rich content editing canvas service for analysis and/or other processing (e.g., spell checking, grammar checking, slash command syntax checking, and so on). In some cases, the frontend application and the rich content editing canvas service can cooperate to analyze user input. For example, the frontend application may be configured to monitor for a nonalphanumeric trigger character, such as a slash typed by the user, after which the frontend application can communicate with the rich content editing canvas service such as described herein.

In other cases, the frontend application can communicate with the backend application exclusively, and the backend application can communicate with the rich content editing canvas service. In this architecture, inputs provided by the user to the graphical user interface, and in particular, the rich content editing canvas rendered within the graphical user interface, can be communicated to the backend application which, in turn, can forward to the rich content editing canvas service. In other cases, the frontend application and/or the backend application can preprocess at least a portion of the user input prior to communicating partial or complete user input to the rich content editing canvas service.

These foregoing examples are not exhaustive; it may be appreciated that may architectures are possible.

Once the user types a slash character to initiate a slash command (or, in other embodiments, other trigger characters or terms or phrases or key combinations), the rich content editing canvas service can operate to generate an ordered set of possible commands. The list of possible commands may be custom to the user, the user's role, the software platform (e.g., a type of software platform), or any other suitable criteria. The suggestions for slash commands may include commands associated with other software platforms and/or commands associated with the software platform itself.

The software platform of FIG. 1 may be any suitable software platform. An example software platform may be a collaboration tool that is one of a suite of collaboration tools defining a collaborative work environment.

Example collaboration tools can include, without limitation: messaging services; telecommunication services; videoconferencing services; issue tracking services; repository services; documentation services; document management systems; knowledge sharing systems; project management services; enterprise resource planning services; supply chain management services; and so on.

In the illustrated embodiment, the software platform is a documentation service, although it is appreciated that this is merely one example.

In particular, the documentation service of FIG. 1 includes a client device 100. The client device 100 can be any suitable electronic device; examples include a desktop or laptop computing device. In other examples, the client device 100 may be a mobile device such as a tablet or a cellular phone. It may be appreciated that these example electronic devices are not exhaustive; any suitable device may be a client device as described herein.

The client device 100 may include a processor and a memory or, more generally, a processor allocation and a memory allocation. The processor may be any suitable virtualized or physical computing device or logical circuit configured to execute one or more instructions to perform or coordinate one or more operations on or to digital data. In many embodiments, the processor or processors of the client device 100 may be a physical processor, although this is not required of all embodiments; virtual components or portions thereof may be suitable in some implementations.

Similarly, a memory of the client device 100 may be configured and/or implemented in a number of suitable ways and may be partially or completely virtualized.

In typical examples, the processor of the client device 100 is configured to access at least one executable asset from the memory of the client device 100. More particularly, the processor of the client device 100 may be configured to access a data store portion of the memory to load, into a working portion of the memory, at least one executable asset or executable program instruction. In response to loading the instruction or executable asset into working memory, the processor of the client device 100 may instantiate an instance of software referred to herein as a client application.

In many embodiments, a client application (also referred to as a "frontend," as noted above) may be configured to provide client-side functionality of a software platform (a documentation service, for FIG. 1). More specifically, the client application may be configured to communicably couple to a separate instance of software executing on, and/or instantiated by, a host system or server configured to provide server-side ("backend") functionality of the software platform (documentation service). In this manner, the documentation service is defined in part by a frontend executing/instantiated on a client device and in part by a backend instantiated on a host server in communication with the frontend, as noted above.

In some cases, the host server supporting the backend is configured to operate within, or as, a virtual computing environment that is supported by one or more physical servers including one or more hardware resources such as, but not limited to (or requiring) one or more of: a processor allocation; a memory allocation (also referred to as a working memory); non-volatile storage (also referred to as persistent memory); networking connections; and the like.

Further, it may be appreciated that although referred to as a singular "server", a host server supporting the backend may be a cluster of different computing resources, which may be geographically separated from one another.

In this manner, because specific implementations may vary, both the host server and the client device 100 can be referred to, simply, as "computing resources" configured to execute purpose-configured software (e.g., the frontend and the backend).

As used herein, the general term "computing resource" (along with other similar terms and phrases, including, but not limited to, "computing device" and "computing network") may be used to refer to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

In view of the foregoing, it may be appreciated that the documentation service of FIG. 1 can include both a host server (not shown in FIG. 1 for simplicity of illustration) and the client device 100. Both the client device 100 and the host server each execute different instances of software that are communicably intercoupled over a computing network.

Specifically, as noted above, the host server executes a backend software application and the client device executes a frontend software application, thereby cooperatively defining the documentation service.

The backend and the frontend of the documentation service (or any other software service described herein) can communicate according to any suitable protocol, form, or format. In many examples, the backend at least partially exposes an application programming interface ("API") that can be accessed by the frontend to perform one or more functions and/or to present data in one or more formats. For example, the frontend may leverage the API to request from and/or provide content to (such as described above) the backend so that the tenant content can be displayed to a user of the client device 100.

For simplicity of description, the embodiments that follow reference a configuration in which a backend and a frontend are configured to communicate and transact information according to a REST API, but it may be appreciated that this is merely one example and in other embodiments other signaling, communication, or data transaction methodologies may be used.

Returning to FIG. 1, in some embodiments the frontend may be a native application configured to execute over the processor(s) of the client device 100. In other cases, the frontend may be configured to operate with and/or in a web browser application. For simplicity of description, the embodiments that follow reference an implementation in which the client application is a browser configured to render the frontend of the documentation service within the browser. It may be appreciated, however, that this is merely one example and is not limiting.

As with many software services, the frontend of the documentation service shown in FIG. 1 is configured to render a graphical user interface for displaying information to a user of the client device 100. More specifically, in many embodiments, the client device 100 includes a display 102 that can be leveraged to render the graphical user interface 104.

The graphical user interface 104 can take any suitable form or shape defined by the frontend or the backend of the documentation service. In the illustrated example, the graphical user interface 104 includes a content view 106 into which a rich content editing canvas 108 can be rendered. As noted above, the rich content editing canvas 108 can be rendered by cooperation of the frontend, the backend, and a rich content editing canvas service (not shown).

The rich content editing canvas 108 can be rendered in the content view 106 in response to a request from the frontend of the backend or the rich content editing canvas service. In particular, a user operating the client device 100 may select an affordance in the graphical user interface 104 indicating an intent to create or modify a document stored by the documentation service. In response to receiving this input from the user, the frontend can create a request to the backend and/or the rich content editing canvas service requesting access to a rich content editing canvas. In response, the backend and/or the rich content editing canvas service can provide a response to the frontend including HTML, CSS, and/or JavaScript necessary for the frontend to render the rich content editing canvas 108.

As with many embodiments described herein, the rich content editing canvas 108 can include a number of features and options for a user. Examples include formatting options, text placement/alignment options, style options, attachment options, multimedia options, data display options, and so on. For example, the user may input plain text into a user input area 110 of the rich content editing canvas 108.

In many embodiments, the rich content editing canvas 108 can provide rich features that leverage a WebSocket or other live connection to the backend of the documentation service and/or to the rich content editing canvas service.

For example, in some embodiments, the rich content editing canvas 108 can be configured to monitor user input to the user input area 110 for specially formatted content, such as a slash command recognized text string 110, which may be preceded by a recognized special character, such as a slash character or other numeric, alphanumeric, or nonalphanumeric character.

In response to detecting that the slash command recognized text string 112 has been input by a user of the rich content editing canvas 108, the rich content editing canvas 108 can present a modal interface 112 that provides one or more options to the user. In many cases, in addition to the modal interface 112, the rich content editing canvas 108 can also present a predicted continuation 114 of the user's input, showing a best-guess continuation of the user's partial input in a contrasting visual manner.

In the illustrated example, the user is presented with several options, listed as the executable instructions 116, to trigger actions in other platforms. For example, the modal interface 112 can present one or more commands, associated with one or more platforms different form the platform defined by the frontend and backend of the documentation system. For example, the executable instructions 116 can be command and control operations directed to an issue tracking system, a project management system, and so on. In some cases, multiple executable instructions associated with the same other platform can be suggested to the user. For example, in the illustrated embodiment, "intruction1" and "intstruction2" may be command and/or control operations for "platform1" and "instruction1" may be a command and control operation for "platform2", each of which are different platforms from the documentation system of the depicted embodiment. As a result of this construction, the user of the documentation platform can quickly and easily command and control other platforms without leaving the context of the documentation platform.

As one example, as a user of the documentation platform begins adding descriptive content describing a project, the user may also want to create a project in an issue tracking system. As a result of these embodiments and architectures, the user can begin typing a slash command and can immediately be presented with contextually relevant suggested commands in other platforms, including a suggestion to create a project within the issue tracking system. For example, the user may type a slash command such as "/issue/create/project/title/new project."

Different platforms can be searched and selected in a number of suitable ways. In some cases, a set of candidate platforms can be filtered based on a particular user input, either by direct string/substring matching, or by lemmatization matching, caseless matching, or any other suitable method. In such examples, a particular user input provided by a user to a rich content editing canvas can be considered a candidate platform identifier. The candidate platform identifier, which may be a substring including alphanumeric characters, can be used to filter a database of candidate platforms. Once filtered, the subset of candidate platforms can be returned to the user and rendered in a modal interface and/or used to inform an autocomplete operation.

In another examples, as the user of the documentation platform continues adding descriptive content, the user may want to message, call, or otherwise contact a colleague to ask a question, solicit input, and so on. As a result of these embodiments and architectures, the user can begin typing a slash command and can immediately be presented with an option to initiate a phone call or messaging session. For example, the user may type a slash command such as "/message/john doe."

These foregoing example are not exhaustive. It may be appreciated that any number of suitable commands, associated with any suitable platform, can be presented to a user providing slash command input to a rich content editing canvas supported by a rich content editing canvas service, as described herein. An issue tracking system can be controlled from an editing dialog of a documentation system, a documentation system can be controlled from a title editing input field of a Kanban board system, a messaging system can be controlled from a chat field of a videoconferencing platform, and so on. Many combinations are possible.

In other embodiments, chains of command and control instructions can be initiated from a modal interface as described above, rendered by operation of a rich content editing canvas as described herein. These sequences of commands and control instructions can be referred to as "macros" or "scripts" and may vary from embodiment to embodiment. More broadly, it may be appreciated that the embodiments described herein are not limited to presenting a single command at a time.

In addition to the foregoing, a rich content editing canvas as described herein can be configured to present command and control options to a user in an order specific to that particular user. For example, in some embodiments, the order in which different command and control instructions are presented in the modal interface 112 may be based on the user's role 118. More particularly, a developer may be presented with different command suggestions and/or a different order of command instructions than an administrator, which may be different from a salesperson.

The order in which possible platforms to control and/or possible instructions to cause to be executed on those platforms can be based on, without limitation: a user's interaction history; a user's command history; a user's command history specific to a particular platform frontend in which the rich content editing canvas is rendered; a user's team's command history; a user's role in a particular platform or group; a user's preferences; and so on. It may be appreciated that these examples are not exhaustive.

In many embodiments, user authentication and permissioning is an important consideration, especially when triggering actions between different platforms. In such examples, the frontend may be configured to transmit instructions to the backend and/or to the rich content editing canvas service including an authentication token issued by the backend, a single sign-on service, one or more other backends or another suitable token issuance authority. In these examples, the user token identifies the user as an authenticated user to the backend and/or to the rich content editing canvas service.

In these examples, the rich content editing canvas service can filter a list of possible suggested commands based on which commands a user is permitted to execute. The permission may be individual to the user or may be based on the user's role. For example, a user of the documentation system that is not authorized to make edits to any data within the issue tracking system may not be presented with any command and control options that modify data.

These foregoing embodiments depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, it may be appreciated that in some cases, a user typing a slash command may be first select a target platform in which to execute a command. Thereafter, the modal interface may be updated to include suggested commands only associated with that platform. For example, FIG. 2A depicts a client device 200 that may be configured in a similar manner as the client deice 100 of FIG. 1.

For example, the client device 200 can include a display 202 and a graphical user interface 204 including a content view 206. The content view 206 can include a rich content editing canvas 208 configured to render a model interface 210 in response to a user typing a slash command 212 that affirmatively identifies a particular target platform in which to execute a particular command. As with previous examples, the rich content editing canvas 208 can be configured to render a predicted continuation 214 (presented in a visually contrasting manner, in many embodiments) that offers the user a top-hit suggestion in addition to and/or in place of one or more suggestions, identified as the executable instructions 210, presented in the modal interface 210.

In this example, as with the example presented in FIG. 1, an order in which the rich content editing canvas 208 presents the executable instructions can be based on the user's role 218 or any other suitable attribute or data item describing the user engaging with the frontend. More particularly, if the user's role 218 is different, such as shown in FIG. 2B, a different set of executable instructions and/or a different ordering of executable instructions may be rendered for the user. In FIG. 2B, the different set of executable instructions is identified as the executable instructions 220.

Figure 2A:
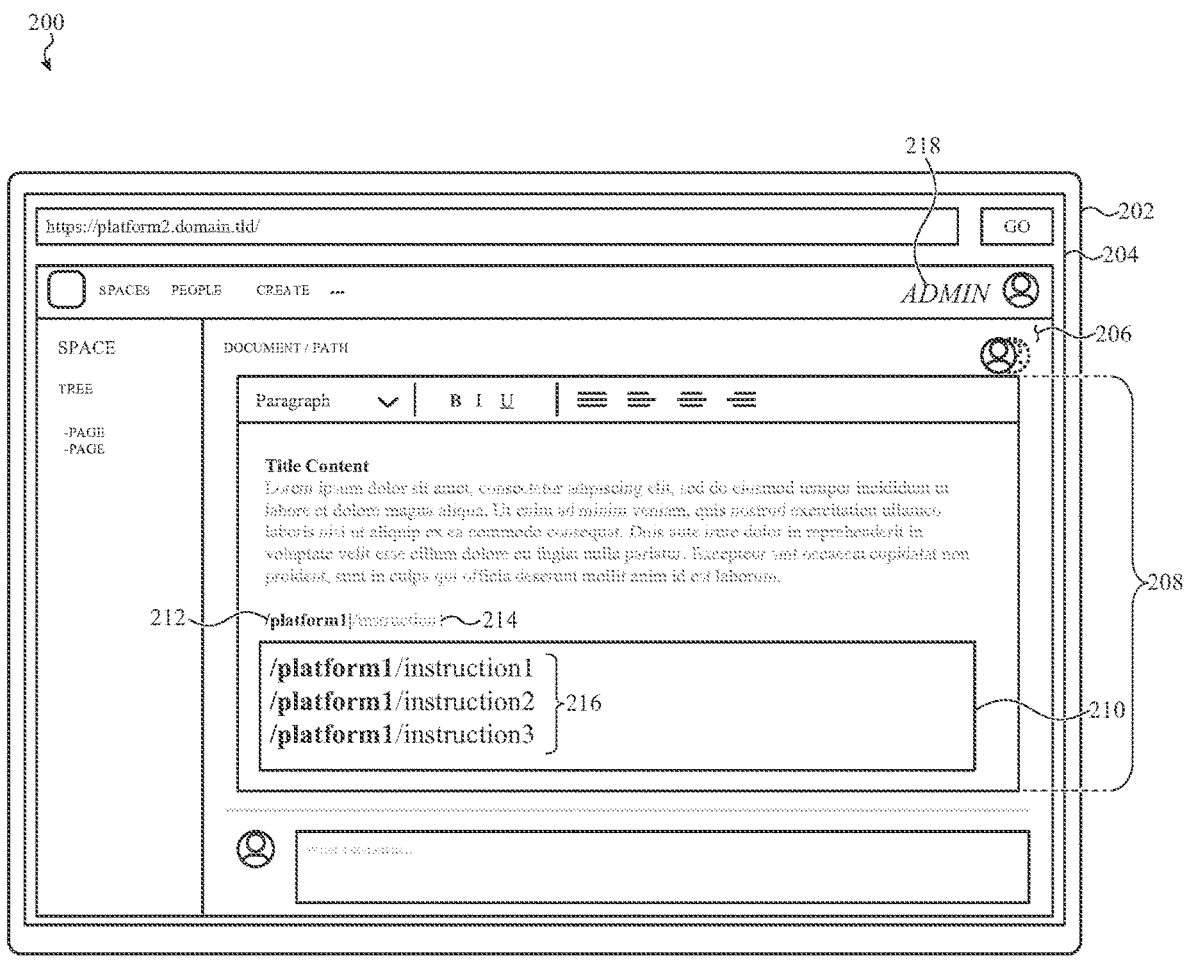
FIG. 2A depicts the display of FIG. 1, rendering the graphical user interface after receiving further input from the user.
Figure 2B:
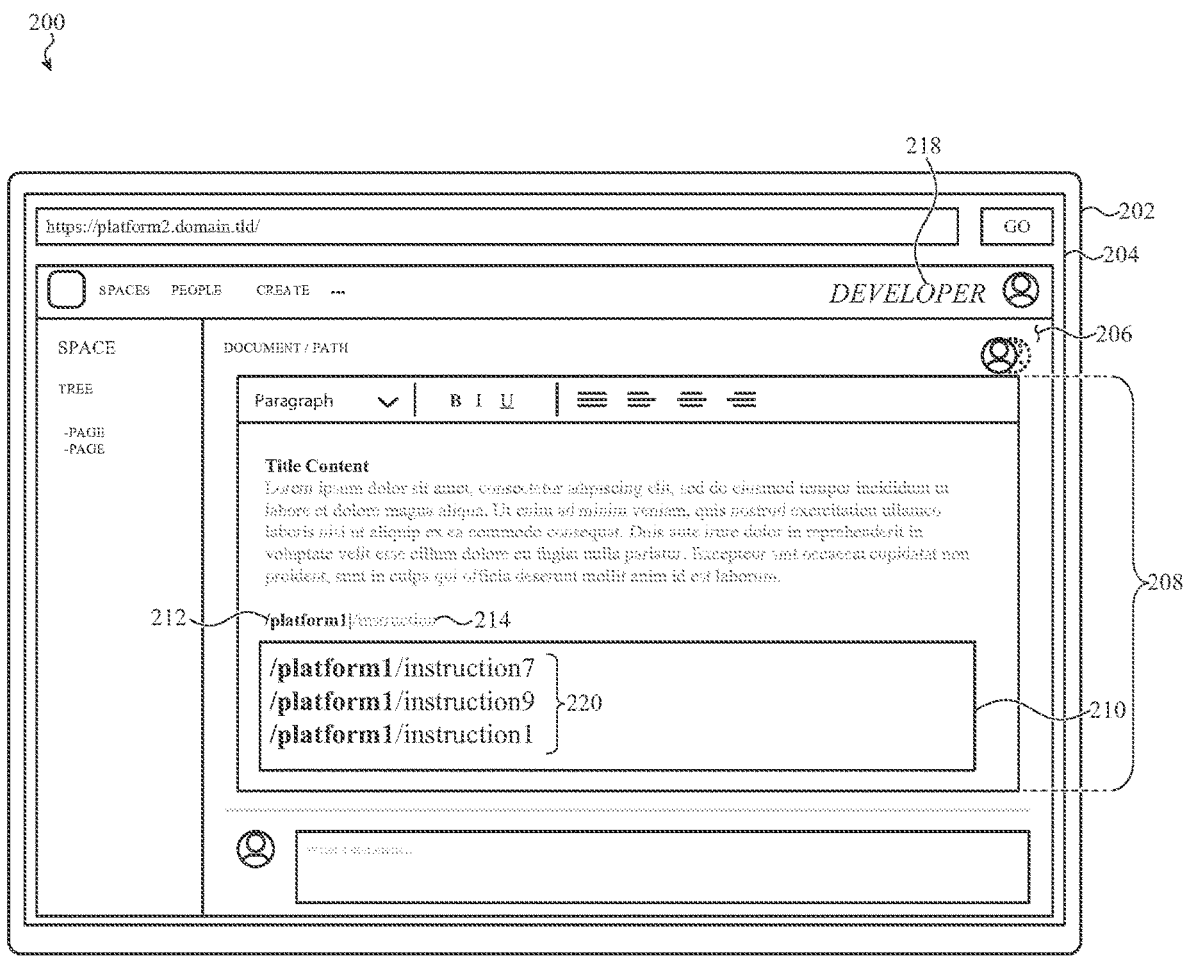
FIG. 2B depicts the display of FIG. 1, rendering the multi-platform rich content editing element in a manner based on the user's role.

These foregoing embodiments depicted in FIGS. 2A-2B and the various alternatives thereof and variations thereto are presented, generally, for purposes of explanation, and to facilitate an understanding of various configurations and constructions of a system and/or a graphical user interface, such as described herein. However, it will be apparent to one skilled in the art that some of the specific details presented herein may not be required in order to practice a particular described embodiment, or an equivalent thereof.

Figure 2C:
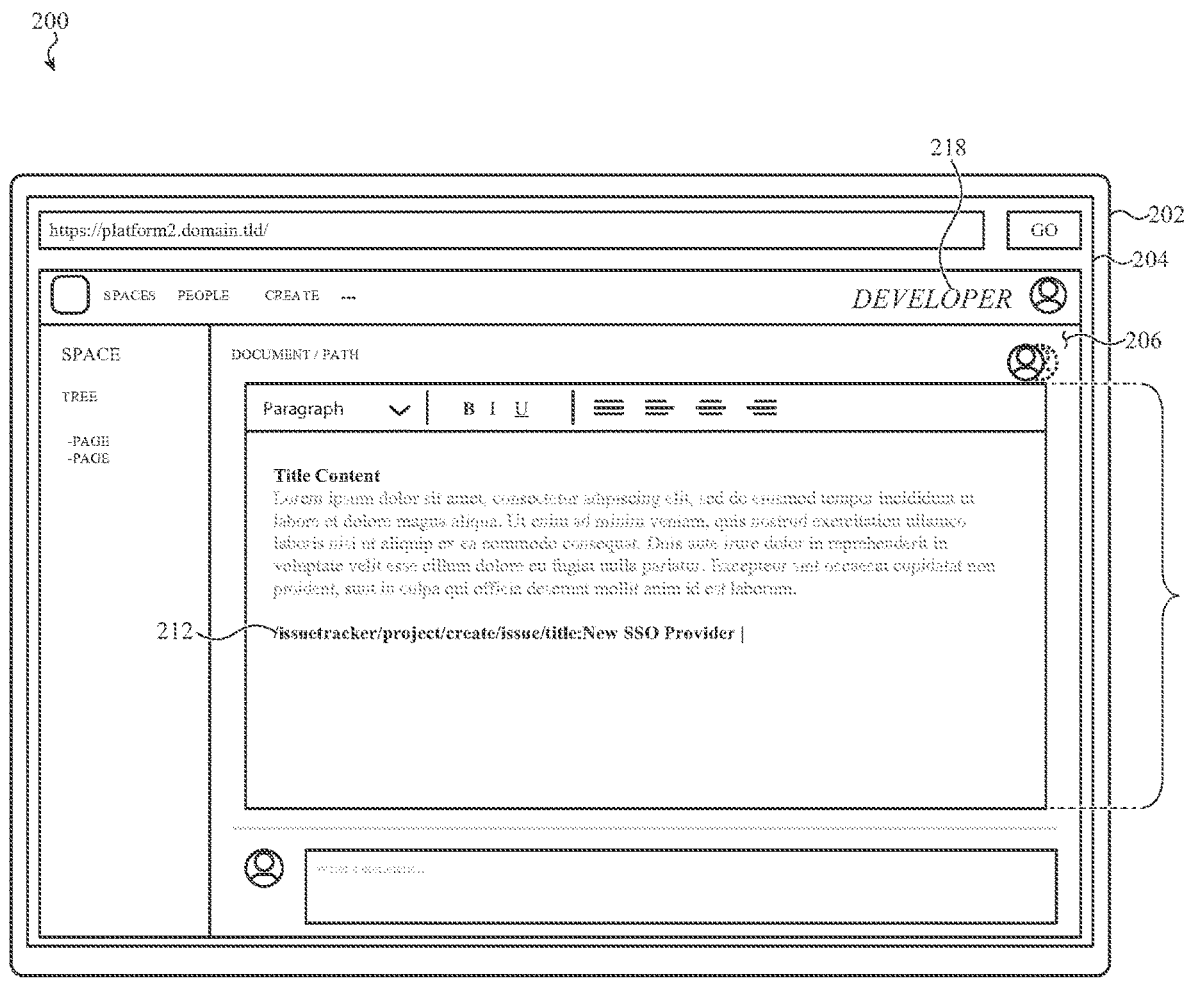
FIG. 2C depicts the display of FIG. 1, having received a complete slash command from a user of the client device.
Figure 2D:
FIG. 2D depicts a display of an electronic device executing an instance of a frontend application associated with an issue tracking system render a graphical user interface including an element based on the user instruction/input provided to the display and graphical user interface of FIG. 2C.

For example, FIG. 2C depicts the client device 200 of FIGS. 2A-2B in which a user has typed a complete instruction as the slash command 212. By way of example, FIG. 2C depicts the slash command 212 as instructing an issue tracking platform to create a new issue with a specified title in the issue tracking platform. FIG. 2D depicts a client device 222 that like other client devices described herein can include a display 224, a graphical user interface 226, and a content view 226. Within the content view 226 can be rendered content corresponding to the issue created by the user of the client device 200 of FIG. 2C.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, as noted above, a rich content editing canvas service as described herein can be configured to provide a rich content editing canvas for any suitable frontend of any suitable platform.

Figure 3A:
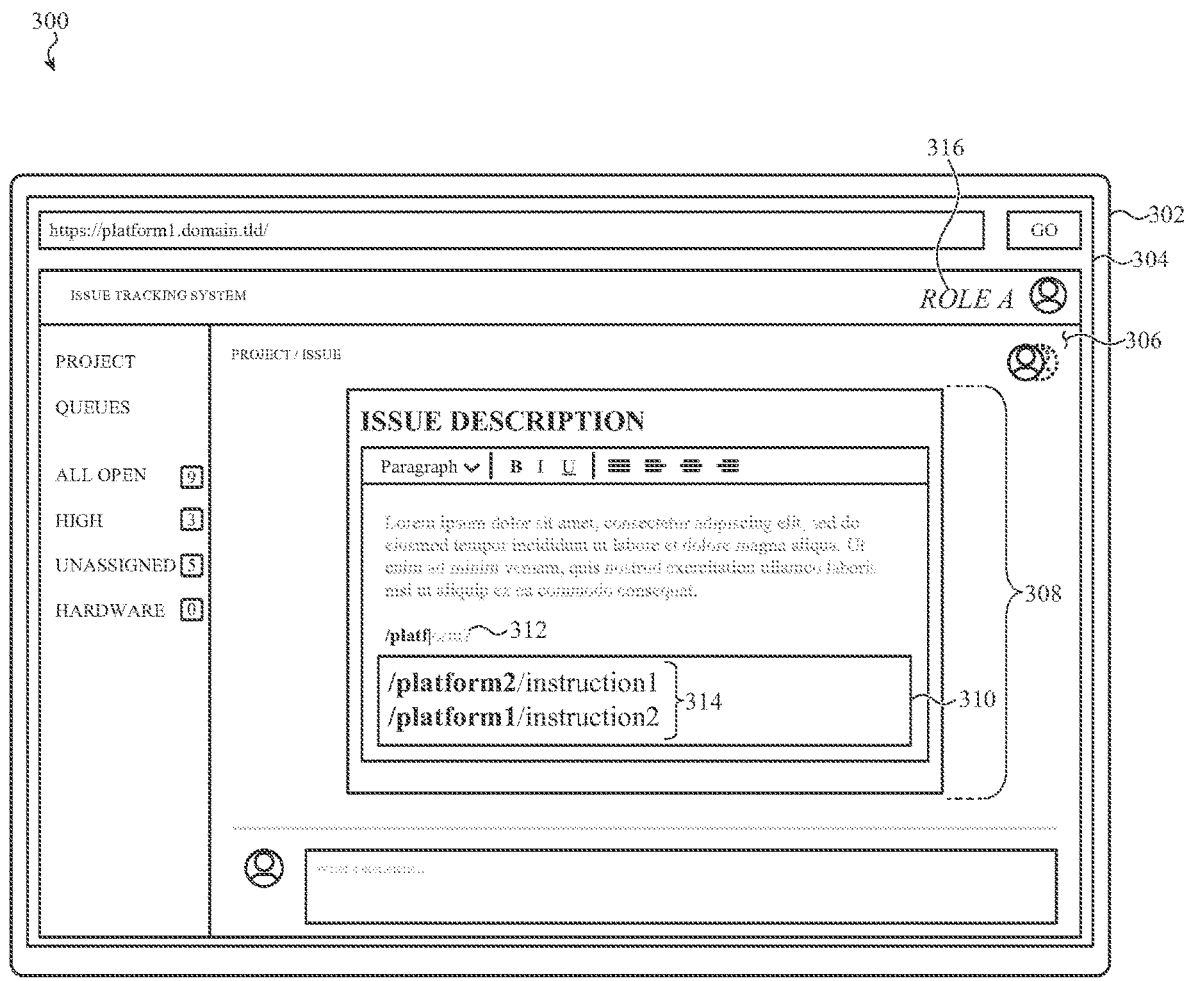
FIG. 3A depicts a display, of an electronic device executing an instance of a frontend application associated with a second software platform, rendering a graphical user interface including the multi-platform rich content editing element of FIG. 1.

For example, FIG. 3A depicts a client device 300 that may be configured in a similar manner as the client device 100 of FIG. 1. In this example, however, the platform may be an issue tracking system.

In this embodiment, as with other client devices described herein, the client device 300 can include a display 302 and a graphical user interface 304 including a content view 306. The content view 306 can include a rich content editing canvas 308—supported by a rich content editing canvas service—configured to render a model interface 310 in response to a user typing a slash command 312 that identifies a particular target platform and/or a particular executable instruction.

Figure 3B:
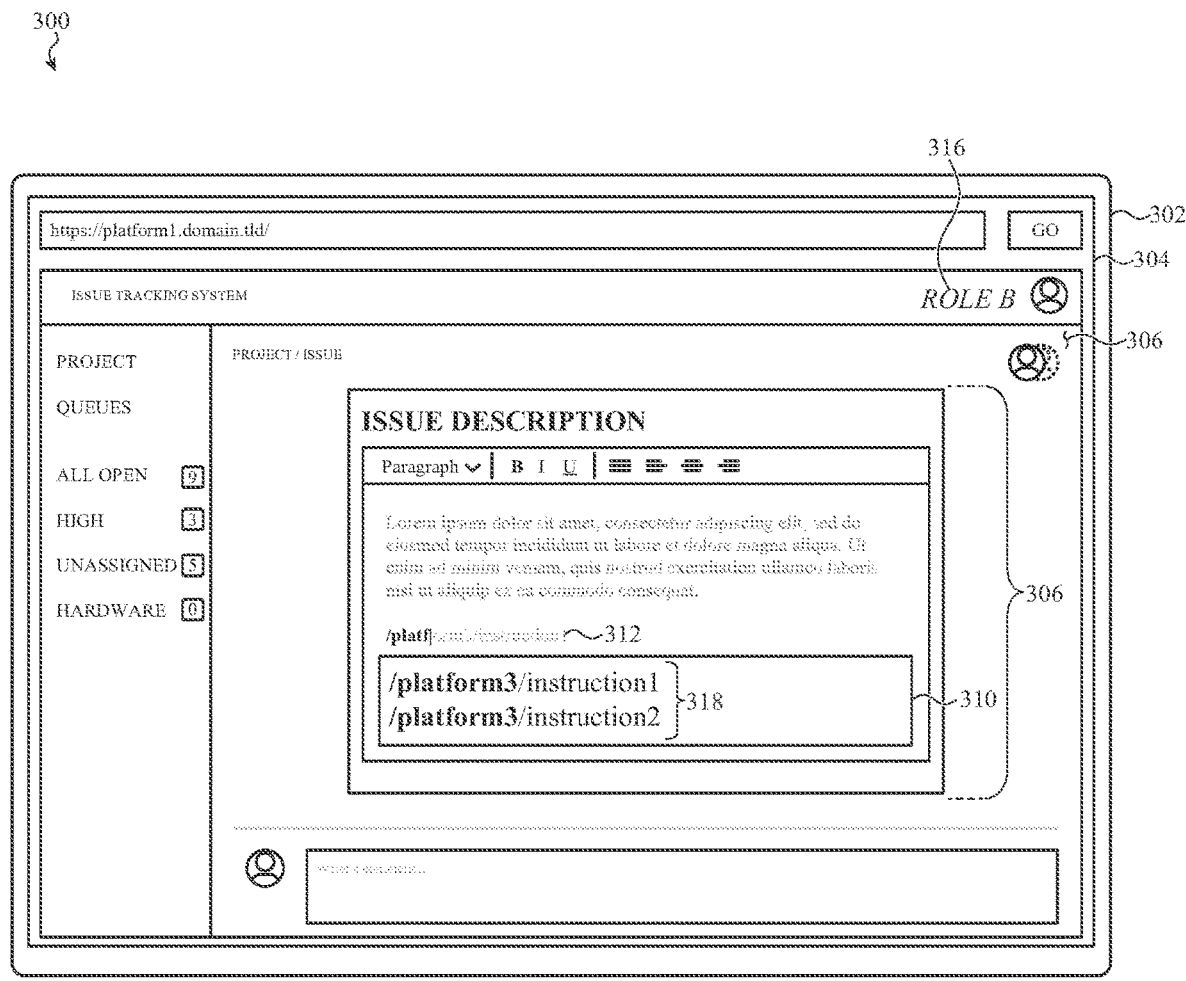
FIG. 3B depicts the display of FIG. 3A, rendering the multi-platform rich content editing element in a manner based on the user's role.

As with previous examples, the rich content editing canvas 308 can be configured to render a predicted continuation that offers the user a top-hit suggestion in addition to and/or in place of one or more suggestions, identified as the executable instructions 310, presented in the modal interface 310. In this example, the executable instructions 310 can be presented in an order based at least in part on a role 316 of the user. For example, FIG. 3B depicts a different set of instructions 318 based on a different role 316. In other cases, the instructions may be filtered and/or ordered in another manner.

More simply, in this embodiment, the same rich content editing canvas shown and described with respect to FIGS. 1-2B is rendered within an "issue description" content view of the graphical user interface of the issue tracking system.

More specifically, the graphical user interface 304 of the issue tracking system can be configured to integrate with a rich content editing canvas service as described herein. In particular, as with other embodiments described herein, the issue tracking system can be defined by a frontend application instantiated by the client device (e.g., by cooperation of a processor and memory associated with the client device) and a backend application instantiated by a host server, whether virtual or physical.

As with other embodiments described herein, the backend application can be communicably coupled to the frontend application so as to receive inputs from the user from and to provide information to the user of the frontend application. In addition, although not depicted in FIG. 3A, the backend application (and/or the frontend application) can be communicably coupled to the rich content editing canvas service either directly or indirectly, which as noted above may also be instantiated on a host server, whether virtual or physical.

In some cases, the rich content editing canvas service instance can be instantiated over the same host server as the backend application of the issue tracking system, but this is not required of all embodiments.

In this construction, the backend application of the issue tracking system and/or the frontend application of the issue tracking system can submit requests (including one or more authorization tokens identifying the user) to and receive inputs from the rich content editing canvas service instance in order to render the rich content editing canvas 308 within the graphical user interface 304 of the frontend application. In some cases, as with other embodiments described herein, the rich content editing canvas service can be configured to transmit to the frontend application an executable file or script, such as a JavaScript™ file or script, that when executed by the frontend application causes to be rendered in the graphical user interface of the frontend application a rich content editing canvas 308 that can receive user input.

As with other embodiments described herein, the rich content editing canvas service can be communicably coupled to the rich content editing canvas 308 and/or the frontend application (e.g., via WebSockets) in order to receive and parse user input to the rich content editing canvas in real time or near real time, such as for slash command processing.

In other cases, the frontend application can communicate with the backend application exclusively, and the backend application can communicate with the rich content editing canvas service. In this architecture, inputs provided by the user to the graphical user interface 304, and in particular, the rich content editing canvas 308 rendered within the graphical user interface 304, can be communicated to the backend application which, in turn, can forward to the rich content editing canvas service. In other cases, the frontend application and/or the backend application can preprocess at least a portion of the user input prior to communicating partial or complete user input to the rich content editing canvas service.

These foregoing examples are not exhaustive; it may be appreciated that may architectures are possible.

Once the user types a slash character to initiate a slash command (or, in other embodiments, other trigger characters or terms or phrases or key combinations), the rich content editing canvas service can operate to generate an ordered set of possible commands. The list of possible commands may be custom to the user, the user's role, the software platform (e.g., a type of software platform), or any other suitable criteria. The suggestions for slash commands may include commands associated with other software platforms and/or commands associated with the software platform itself.

These foregoing embodiments depicted in FIGS. 3A-3B and the various alternatives thereof and variations thereto are presented, generally, for purposes of explanation, and to facilitate an understanding of various configurations and constructions of a system and/or a graphical user interface, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 4:
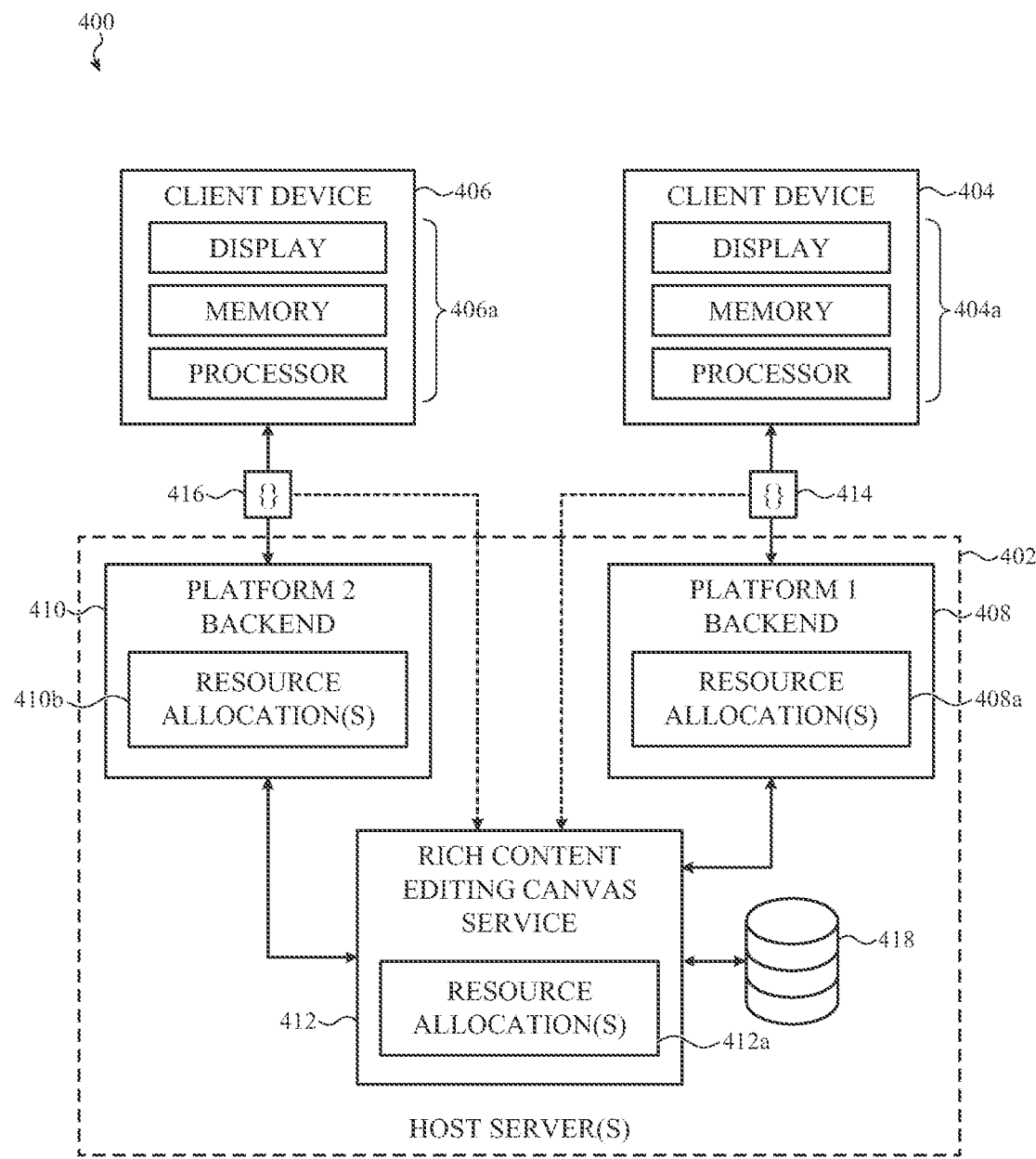
FIG. 4 depicts a simplified architecture diagram of a system, such as described herein.

FIG. 4 depicts a simplified diagram of a system, such as described herein. The system 400 is depicted as implemented in a client-server architecture, but it may be appreciated that this is merely one example and that other communications architectures are possible.

In particular the system 400 includes a set of host servers 402 which may be one or more virtual or physical computing resources (collectively referred in many cases as a "cloud platform"). In some cases, the set of host servers 402 can be physically collocated or in other cases, each may be positioned in a geographically unique location.

The set of host servers 402 can be communicably coupled to one or more client devices; two example devices are shown as the client device 404 and the client device 406. The client devices 404, 406 can be implemented as any suitable electronic device. In many embodiments, the client device 404, 406 are personal computing devices such as desktop computers, laptop computers, or mobile phones. This is merely one example and is not required of all embodiments.

The set of host servers 402 can be supporting infrastructure for one or more backend applications, each of which may be associated with a particular software platform, such as a documentation platform or an issue tracking platform.

In particular, a portion of the set of host servers 402 can be allocated as physical infrastructure supporting a first platform backend 408 and a different portion of the set of host servers 402 can be allocated as physical infrastructure supporting a second platform backend 410.

As noted with respect to other embodiments described herein, the two different platforms maybe instantiated over physical resources provided by the set of host servers 402. Once instantiated, the first platform backend 408 and the second platform backend 410 can communicably couple to a rich content editing canvas service 412 that can, as noted above, be configured to cooperate with the first platform backend 408 and the second platform backend 410 to render a rich content canvas within one or more portions of respective frontends of each of the first platform backend 408 and the second platform backend 410.

More specifically, the first platform backend 408 can be configured to communicably couple to a first platform frontend instantiated by cooperation of a memory and a processor of the client device 404. Once instantiated, the first platform frontend can be configured to leverage a display of the client device 404 to render a graphical user interface so as to present information to a user of the client device 404 and so as to collect information from a user of the client device 404. Collectively, the processor, memory, and display of the client device 404 are identified in FIG. 4 as the client devices resources 404a.

As with many embodiments described herein, the first platform frontend can be configured to communicate with the first platform backend 408 and/or the rich content canvas editing service 412. Information can be transacted by and between the frontend, the first platform backend 408 and the rich content canvas editing service 412 in any suitable manner or form or format. In many embodiments, as noted above, the client device 404 and in particular the first platform frontend can be configured to send an authentication token 414 along with each request transmitted to any of the first platform backend 408 or the rich content editing canvas service 412.

Similarly, the second platform backend 410 can be configured to communicably couple to a second platform frontend instantiated by cooperation of a memory and a processor of the client device 406. Once instantiated, the second platform frontend can be configured to leverage a display of the client device 406 to render a graphical user interface so as to present information to a user of the client device 406 and so as to collect information from a user of the client device 406. Collectively, the processor, memory, and display of the client device 406 are identified in FIG. 4 as the client devices resources 406a.

As with many embodiments described herein, the second platform frontend can be configured to communicate with the second platform backend 410 and/or the rich content canvas editing service 412. Information can be transacted by and between the frontend, the second platform backend 410 and the rich content canvas editing service 412 in any suitable manner or form or format. In many embodiments, as noted above, the client device 406 and in particular the second platform frontend can be configured to send an authentication token 416 along with each request transmitted to any of the second platform backend 410 or the rich content editing canvas service 412.

As a result of these constructions, the rich content editing canvas service 412 can provide uniform feature sets to users of either the client device 404 or the client device 406. For example, the rich content editing canvas service 412 can implement a slash command processor to receive input provided by a user of the client device 404 to the first platform and/or to receive input provided by a different user of the client device 406 to the second platform. In these examples, the rich content editing canvas service 412 can be configured to operate to generate suggestions to each respective user so that each user is presented with relevant commands that each respective user may desire to cause to be executed against or by the opposite platform; a user of the first frontend may be presented with command and control executable instructions that cause one or more actions to be taken by the second platform backend 410 and vice versa—a user of the second frontend may be presented with command and control executable instructions that cause one or more actions to be taken by the first platform backend 408.

As noted above, the instructions/options presented to each user of each client device may vary in a user specific manner. For example, based on each respective user's role as defined in either the first platform or the second platform. In some cases, the rich content editing canvas service 412 can access a database 418 to obtain a user history to determine which commands a user historically triggers given particular context. For example, a user of an issue tracking system may often execute slash commands to add paragraphs to a page of a documentation system within a threshold time interval of opening a new issue. In another example, a user of a documentation system may often schedule a meeting via a slash command shortly after creating a new page in a documentation system. These examples are not exhaustive; may variations are possible in view of the embodiments described herein.

These foregoing embodiments depicted in FIG. 4 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 5:
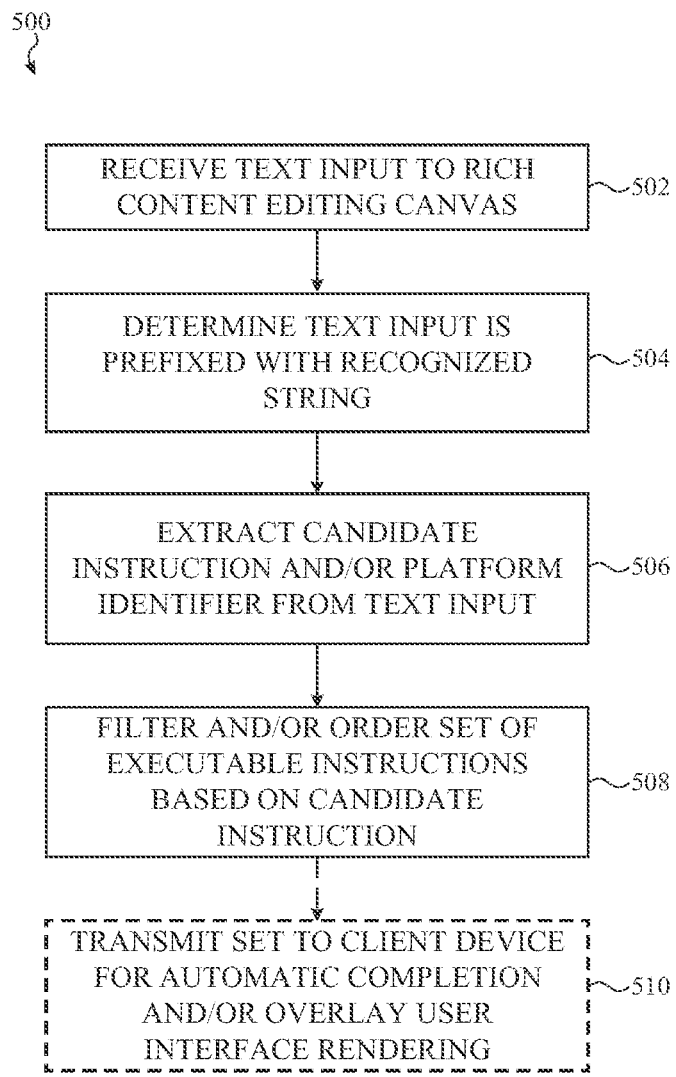
FIG. 5 is a flowchart depicting example operations of a method of receiving instructions to operate a second platform backend from a frontend of a first software platform.

FIG. 5 is a flowchart depicting example operations of a method of receiving instructions to operate a second platform backend from a frontend of a first software platform.

The method 500 can be performed by any suitable hardware or software instance, whether virtualized or physical. In many cases, the method 500 can be performed in part by a frontend application instance, in part by a backend application instance, and/or in part by a rich content editing canvas service as described herein. In some cases, the method 500 can be performed entirely by a rich content editing service, a frontend instance, or a backend instance. Many variations and architectures are possible.

The method 500 includes operation 502 in which text input is received at a rich content editing canvas, such as may be rendered within a graphical user interface of a frontend application by cooperation of the frontend application and a rich content editing canvas system as described herein.

The method 500 includes operation 504 at which it is determined whether the text input is prefixed with a recognized string. The string may be a single character (such as in the case of a slash command) or the string may contain multiple characters. The string may be numeric, nonnumeric, alphanumeric, nonalphanumeric, or may be an encoded character (e.g., UTF-8, ASCII, and so on).

The method 500 includes operation 506 at which a candidate instruction and/or platform string/identifier is extracted from the (partial) user input. The candidate instruction may be a partial string corresponding to a particular platform or to a particular executable instruction associated with a particular platform.

The method 500 includes operation 508 at which a list of possible executable instructions associated with a particular platform or more than one platforms maybe filtered based on the candidate instruction extracted from the (partial) user input provided to the rich content editing canvas. As noted above, the executable instructions can be selected in some embodiments by filtering a set or list of candidate executable instructions, each of which may be associated with a particular platform. In some cases, a platform may be selected before a set of candidate instructions associated with that platform may be selected; in such examples partial user input can be used to filter a set or list of candidate platforms, and after a user selects a particular platform, the selected platform and/or further user input can be leveraged to filter a list of candidate executable instructions that may be executed by the selected platform.

The method 500 includes operation 510, which may in some embodiments be optional, at which the filtered list of possible options may be transmitted to a client device which, in response, may render a modal interface element (also referred to as a popup element or overlay window), or any other suitable interface element containing content of the filtered set of instructions. In addition, the filtered set may be used for autocompletion suggestions of the user's partial input.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

Furthermore the foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

What is claimed is:

1. A client-server system defining a first platform comprising:
    a backend canvas service executing by operation of a processor and a memory allocated to a host server, the backend canvas service configured to:
        communicably couple to a frontend instance of a second platform separate from the first platform, the frontend instance executing by operation of a client device comprising a display, the frontend instance configured to render a graphical user interface via the display, the backend canvas service providing a rich content editing canvas integrated within the graphical user interface of the frontend instance of the second platform, the backend canvas service providing the same rich content editing canvas integrated within a graphical user interface of another frontend instance of a third platform separate from the first platform and the second platform;
        receive, from the frontend instance, information comprising:
            a token identifying an authenticated user of the first platform; and
            a text input received by the rich content editing canvas;
        determine that the text input is prefixed with a recognized string;
        extract a candidate instruction substring from a portion of the text input succeeding the recognized string;
        select, from a set of executable instructions hosted by the backend canvas service, a subset of executable instructions associated with operations executable by the first platform, wherein each selected executable instruction comprises an attribute string containing the candidate instruction substring;
        transmit the subset of executable instructions to the frontend instance of the second platform, thereby causing to be rendered, in the rich content editing canvas integrated within the graphical user interface of the frontend instance of the second platform, the subset of executable instructions; and in response to receiving a selection of a particular executable instruction from the subset of executable instructions, cause to be executed, on the first platform, a particular operation associated with the particular executable instruction.

2. The first platform of claim 1, wherein the backend canvas service is configured to:
receive from the first platform a result of execution of the particular operation associated with the selected executable instruction by the first platform; and
causing to be displayed in the graphical user interface an indication corresponding to the result.

3. The first platform of claim 1, wherein the backend canvas service is configured to filter the subset of executable instructions to remove executable instructions that the authenticated user, identified by the token, is not permitted to cause to be executed on the first platform.

4. The first platform of claim 1, wherein the backend canvas service is configured to normalize the candidate instruction substring prior to selecting the subset of executable instructions.

5. The first platform of claim 4, wherein normalizing the candidate instruction substring comprises one or more of:
lemmatizing the candidate instruction substring;
tokenizing the candidate instruction substring; or
changing a case of the candidate instruction substring.

6. The first platform of claim 1, wherein the recognized string comprises a nonalphanumeric character.

7. The first platform of claim 1, wherein:
the token is a first token;
the authenticated user is a first authenticated user; and
the backend canvas service is configured to obtain a second token identifying a second authenticated user of the second platform.

8. The first platform of claim 7, wherein the backend canvas service is configured to obtain the second token from a single sign-on service communicably coupled to each of the first platform and the second platform.

9. The first platform of claim 7, wherein the backend canvas service is configured to obtain the second token from the second platform.

10. The first platform of claim 7, wherein the backend canvas service is configured to:
receive from the frontend instance, information comprising the second token identifying the authenticated user of the second platform; and
a selection of an executable instruction from the ordered subset of executable instruction; and
causing to be executed, by the second platform, the selected executable instruction.

11. A client-server system defining a first platform comprising:
a backend canvas service executing by operation of a processor and a memory allocated to a host server, the backend canvas service configured to:
communicably couple to a frontend instance of a second platform separate from the first platform, the frontend instance executing by operation of a client device comprising a display, the frontend instance configured to render a graphical user interface via the display, the backend canvas service providing a rich content editing canvas integrated within the graphical user interface of the frontend instance of the second platform, the backend canvas service providing the same rich content editing canvas integrated within a graphical user interface of a frontend instance of a third platform separate from the first platform and the second platform;
receive, from the frontend instance of the second platform, a text input from a user of the client device entered via the rich content editing canvas;
receive a token authenticating the user to the first platform from the frontend instance of the second platform;
transmit, to the frontend instance, an ordered subset of executable instructions of a set of executable instructions hosted by the backend canvas service, each executable instruction of the subset of executable instructions associated with a respective operation executable by the first platform; and
cause to be rendered in the graphical user interface of frontend instance of the second platform, the ordered subset of executable instructions.

12. The first platform of claim 11, wherein the frontend instance of the second platform is configured to render the ordered subset of executable instructions within an overlay window rendered below the rich content editing canvas.

13. The first platform of claim 11, wherein the backend canvas service is configured to parse the text input to determine whether the text input contains a recognized string.

14. The first platform of claim 13, wherein the recognized string comprises a nonalphanumeric character.

15. The first platform of claim 11, wherein the first platform is a documentation platform and the second platform is an issue tracking system platform.

16. A method of triggering actions by a backend of a second platform from a frontend of a first platform, the method comprising:
hosting, at the backend of the second platform, a set of executable instructions;
receiving at the frontend a first user input comprising a text string;
determining that the text string is prefixed with a recognized string;
extracting from the text string, after the recognized string, a candidate instruction string;
selecting, by the backend of the second platform, the second platform from a list of candidate platforms separate from the first platform based on at least one of the candidate instruction string or the recognized string;
filtering, by the backend of the second platform, the set of executable instructions to obtain a list of executable instructions associated with the second platform based on one or executable instructions previously selected by the user;
causing to be rendered in a graphical user interface of the frontend of the first platform, the filtered list of executable instructions;
receiving at the frontend a second user input comprising a selection of one of the filtered list of executable instructions; and
causing to be executed by the second platform, the selected executable instruction.

17. The method of claim 16, wherein determining that the text string is prefixed with the recognized string is performed by the frontend.

18. The method of claim 16, wherein determining that the text string is prefixed with the recognized string is performed by a backend of the first platform.

19. The method of claim 16, further comprising:
prior to selecting the second platform from the list of candidate platforms, causing to be rendered in the graphical user interface of the frontend the list of candidate platforms; and
receiving at the frontend a third user input comprising a selection of the second platform.

\* \* \* \* \*